Patented Nov. 1, 1938

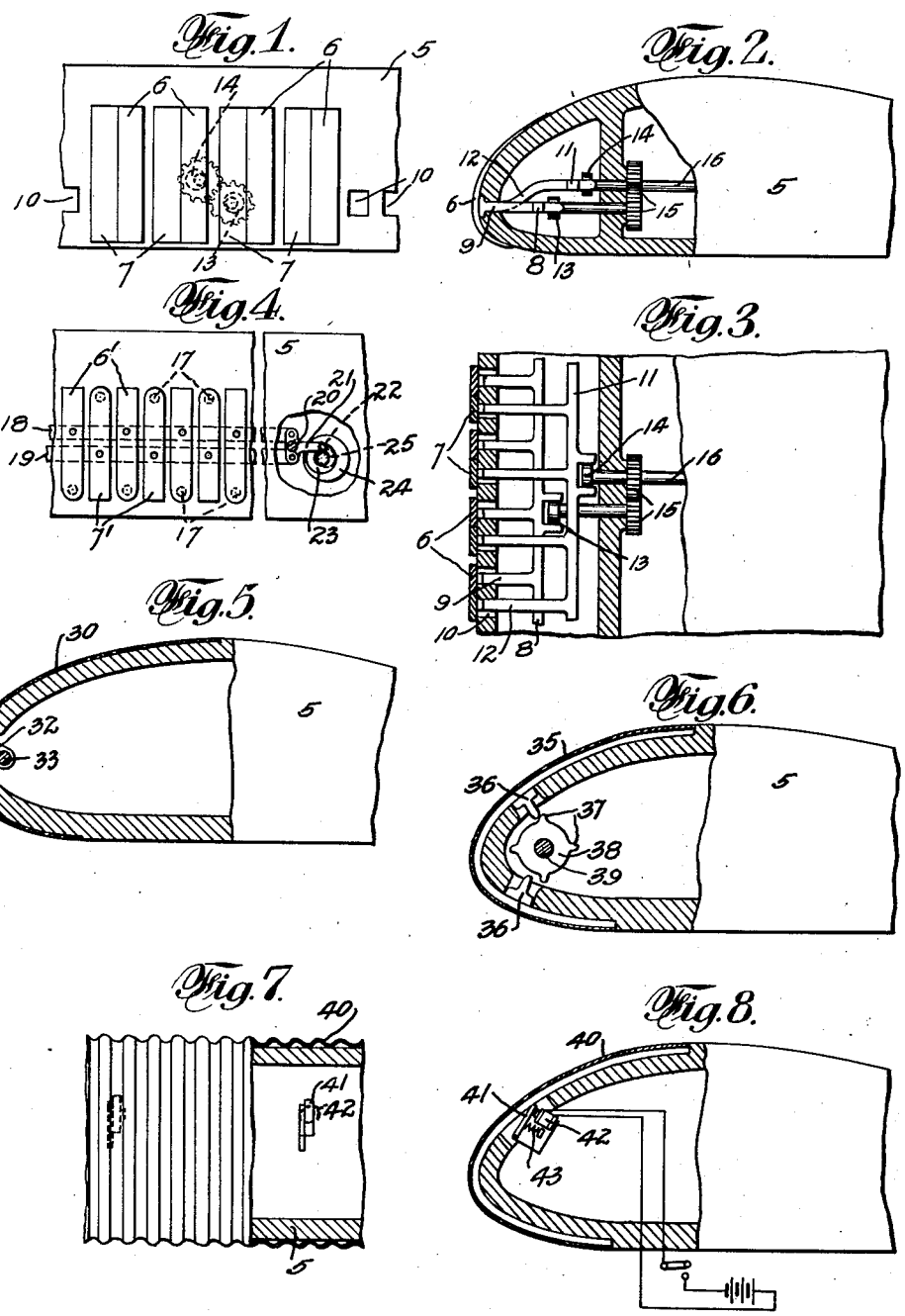

2,135,119

UNITED STATES PATENT OFFICE 2,135,119

AIRPLANE DEVICE

Peirce M. Wood, Mamaroneck, N. Y.

Application May 11, 1935, Serial No. 21,002

4 Claims. (Cl. 244—134)

My invention relates to an airplane and more particularly to means for eliminating ice or preventing the formation of ice on a wing or other part.

While the invention will be described in connection with an airplane it is to be understood that the principles of the invention are of broader application and certain features may be used in connection with other transportation devices. Furthermore, I shall use the term "airplane wing" herein to denote any part upon which ice is likely to form and to which my invention is applicable for the elimination of ice or prevention of the formation of ice thereon.

It is the principal object of the invention to provide means for eliminating ice from an airplane wing or the prevention of the formation of ice thereon.

The invention briefly stated comprises means for vibrating or agitating the surface of an airplane wing, preferably quite rapidly, so as to prevent the formation of ice thereon and secondarily to crack and free ice which has already formed.

In the drawing which show, for illustrative purposes only, several of the many forms in which my invention may be embodied—

Fig. 1 is a fragmentary front view of an airplane wing illustrating features of the invention;

Fig. 2 is an end view in partial section of the wing shown in Fig. 1;

Fig. 3 is a top plan view in partial section of the wing shown in Fig. 1;

Fig. 4 is a view similar to Fig. 1 but illustrating a modification;

Fig. 5 is a view similar to Fig. 2 but illustrating a further modified form;

Fig. 6 is a view similar to Fig. 5 and illustrating a still further modification;

Fig. 7 is a front view in partial section of an airplane wing and illustrating an electrical vibrator means; and Fig. 8 is an end view in partial section of the wing and parts shown in Fig. 7.

In said drawing 5 indicates an airplane wing having in the form shown in Figs. 1 to 3 a plurality of slats or vibrators 6—7 thereon. These slats may be positioned wherever there is likelihood of ice formation, principally on the leading edge of the wing. These slats preferably conform to the shape of or form a part of the wing and are movable toward and from each other and in their extreme limits of movement may engage each other. The slats may be vibrated in any suitable manner. In the form shown in Figs. 1 to 3 all of the slats 6—6 may be secured to a comb member 8, the teeth or projections 9 of which extend through openings, such as 10, in the wing. All of the other slats 7—7 are secured to a similar comb member 11, the teeth or projections 12—12 of which likewise extend through the openings 10. The two combs secured to the various slats are vibrated or moved back and forth relatively to each other by suitable means, such as by eccentrics 13—14, fitting in follower slots on the respective combs 8—11. The eccentrics are mounted on shafts which are preferably geared together, as indicated at 15 and the main drive shaft, actuated from any suitable source of power, is indicated at 16. It will be clear, therefore, that upon rotation of shaft 16 the eccentrics will serve to reciprocate the combs relatively to each other, which will cause the slats to approach and recede from each other and the slats are preferably of such width that they contact each other at both extreme movements.

The vibration of the slats is preferably quite rapid so as to prevent the formation of ice on the rapidly vibrated or agitated surfaces.

In the modification shown in Fig. 4 the slats 6'—6', 7'—7', instead of being movable as a whole, are pivoted to the wing, as indicated at 17, and the alternate slats, as indicated in Fig. 4, are pivoted to bars 18—19, which are themselves pivoted to an actuating lever block 20, having a finger 21 carrying a roll 22, fitting in a cam groove 23 in a cam plate 24, which is rotated by the shaft 25. Thus, upon rotation of the shaft 25 the actuating lever member 20 will be rocked back and forth so as to cause the free ends of the slats 6'—7' to vibrate back and forth and the slats may engage each other upon both extreme movements. The action of that form shown in Fig. 4 is substantially the same as that of the previous form.

In the modification shown in Fig. 5 the wing is covered with fabric 30 and there is an abutment member 31 either secured thereto or in position to engage the same. The abutment member 31 may be vibrated by a rotating finger 32, carried by the rotating shaft 33, which is rotated by any suitable means. Thus, as the shaft 33 is rotated the abutment 31 and with it the wing surface 30 will be vibrated so as to prevent the formation of ice and secondarily to tend to knock off such ice as may have been formed.

In the form shown in Fig. 6 the wing covering 35 is of corrugated metal and at spaced apart points there are a plurality of vibrating abutment members 36—36, secured to or positioned to engage the corrugated surface 35. The abutments 36—36 have parts engageable by the lugs 37 on the rotatable vibrator plate 38, carried by and rotatable by the shaft 39, which is rotated by any suitable means. The rotation of the shaft 39 will serve to vibrate the surface 35, the frequency of vibration being determined by the number of vibrator points 37, the speed of the shaft and the location of the vibrating abutments 36—36.

In the form shown in Figs. 7 and 8 the airplane wing surface 40 is corrugated, as in the previous form, and the surfaces vibrated by means of an electrical armature 41 and coil 42. In the form shown the armature 41 is forced outwardly into engagement with the surface 40 by means of a spring 43 and is retracted by means of the coil 42. The particular construction of the vibrator shown in Figs. 7 and 8 need not be described, since electric vibrators are common and their operation well understood.

It will thus be seen that with all forms of the invention either the surface itself or parts directly over the surface of the wing may be vibrated at the desired frequency so as to prevent the formation of ice during flight and the vibration may also have some effect in removing ice if already formed.

While certain forms of the invention have been shown in connection with wings of particular form, it is to be understood that in general the form of wing is not material.

While the invention has been described in considerable detail and some forms illustrated it is to be understood that various changes and modifications may be made within the scope of the invention as defined in the appended claims.

I claim:

1. In a device of the character indicated, an airplane wing, a plurality of relatively movable slats on the outside of said wing, and means within the wing and coacting with said slats for moving the latter toward and away from each other, for the purpose described.

2. In a device of the character indicated, an airplane wing, and means within the wing section for mechanically striking the inner surface of the wing at the leading edge to cause the latter to vibrate, for the purpose described.

3. In a device of the character indicated, an airplane wing, a rapidly acting vibrator within the wing section for forcibly striking the inner portion of said wing at the leading edge to vibrate the latter rapidly, for the purpose described.

4. In a device of the character indicated, an airplane wing, an electric vibrating means within the wing section for striking an inner portion of said wing at the leading edge to vibrate the latter, for the purpose described.

PEIRCE M. WOOD.